United States Patent
Rothstein et al.

(10) Patent No.: US 10,135,736 B1
(45) Date of Patent: *Nov. 20, 2018

(54) DYNAMIC TRUNK DISTRIBUTION ON EGRESS

(71) Applicant: F5 Networks, Inc., Seattle, WA (US)

(72) Inventors: Jesse Abraham Rothstein, Seattle, WA (US); Arindum Mukerji, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 302 days.

This patent is subject to a terminal disclaimer.

(21) Appl. No.: 14/203,184

(22) Filed: Mar. 10, 2014

Related U.S. Application Data

(63) Continuation of application No. 13/457,322, filed on Apr. 26, 2012, now Pat. No. 8,711,689, which is a
(Continued)

(51) Int. Cl.
*H04J 3/16* (2006.01)
*H04L 12/803* (2013.01)
(Continued)

(52) U.S. Cl.
CPC ........ *H04L 47/125* (2013.01); *H04L 43/0888* (2013.01); *H04L 49/25* (2013.01)

(58) Field of Classification Search
USPC .... 370/229, 230.1, 235, 351, 386, 389, 392, 370/394, 396, 397, 401, 437, 465;
(Continued)

(56) References Cited

U.S. PATENT DOCUMENTS

| 5,757,795 A | 5/1998 | Schnell |
| 5,920,705 A * | 7/1999 | Lyon ................... H04L 12/4608 370/409 |

(Continued)

OTHER PUBLICATIONS

Stevens, "TCP Slow Start, Congestion Avoidance, Fast Retransmit, and Fast Recovery Algorithms," Jan. 1997, pp. 1-5, Network Working Group, accessed May 14, 2007 http://www.apps.ieft.org/rfc/rfc2001.html.
(Continued)

*Primary Examiner* — Yemane Mesfin
*Assistant Examiner* — Mon Cheri Davenport
(74) *Attorney, Agent, or Firm* — John W. Branch; Lowe Graham Jones PLLC

(57) ABSTRACT

A method, apparatus, and system are directed toward managing network traffic over a plurality of Open Systems Interconnection (OSI) Level 2 switch ports. A network traffic is received over the plurality of OSI Level 2 switch ports. At least a part of the network traffic is categorized into a flow. The categorization may be based on a IP address, an OSI Level 4 port, a protocol type, a Virtual Local Area Network (VLAN) number, or the like, associated with the network traffic. One of the plurality of OSI Level 2 switch ports is selected based on a load-balancing metric. The load-balancing metric may be a priority of the flow, a congestion characteristic, a prediction of a load usage for the flow, a combination thereof, or the like. A frame associated with the flow is sent over the selected one of the plurality of OSI Level 2 switch ports.

20 Claims, 4 Drawing Sheets

Related U.S. Application Data continuation of application No. 11/925,381, filed on Oct. 26, 2007, now Pat. No. 8,189,476.

(60) Provisional application No. 60/965,620, filed on Aug. 20, 2007.

(51) Int. Cl.
*H04L 12/26* (2006.01)
*H04L 12/947* (2013.01)

(58) Field of Classification Search
USPC .................................................. 709/238, 250
See application file for complete search history.

(56) References Cited

U.S. PATENT DOCUMENTS

| | | | |
|---|---|---|---|
| 6,023,563 A | 2/2000 | Shani | |
| 6,049,528 A | 4/2000 | Hendel et al. | |
| 6,981,014 B2 | 12/2005 | Jayam et al. | |
| 7,426,561 B2* | 9/2008 | Dani | H04L 67/1008 709/223 |
| 8,009,566 B2 | 8/2011 | Zuk et al. | |
| 8,189,476 B1* | 5/2012 | Rothstein | H04L 47/125 370/235 |
| 8,711,689 B1* | 4/2014 | Rothstein | H04L 47/125 370/229 |
| 2005/0108444 A1* | 5/2005 | Flauaus | H04L 12/2602 710/15 |
| 2008/0253366 A1 | 10/2008 | Zuk et al. | |
| 2008/0291826 A1* | 11/2008 | Licardie | H04L 47/10 370/230 |

OTHER PUBLICATIONS

Jacobson, V. et al., "TCP Extensions for High Performance," Network Working Group, Request for Comments 1323, May 1992, 31 pages, accessed Jan. 31, 2008 http://www.ieft.org/rfc/rfc1323.txt?number=1323.

Hewit, John R. et al., "Securities Practice and Electronic Technology," Corporate Securities Series, New York: Law Journal Seminars-Press, 1998, title page, bibliography page, pp. 4.29-4.30.

Ramakrishnan, et al., "The Addition of Explicit Congestion Notification (ECN) to IP," Sep. 2001, pp. 1-49, Network Working Group, accessed May 14, 2007 http://www.apps.ietf.org/rfc/rfc3168.html.

Reardon, Marguerite, "A Smarter Session Switch: Arrowpoint's CS Session Switches Boast the Brains Needed for E-Commerce," Data Communications, Jan. 1999, title page, pp. 3, 5, 18.

"Transmission Control Protocol—DARPA Internet Program Protocol Specification," Sep. 1981, pp. 1-91, Information Sciences Institute, Marina del Rey, California, accessed May 14, 2007 http://tools.ietf.org/html/rfc793.

Official Communication for U.S. Appl. No. 11/925,381 dated Sep. 16, 2009.

Official Communication for U.S. Appl. No. 11/925,381 dated Mar. 16, 2010.

Official Communication for U.S. Appl. No. 11/925,381 dated Jun. 9, 2010.

Official Communication for U.S. Appl. No. 11/925,381 dated Aug. 4, 2010.

Official Communication for U.S. Appl. No. 11/925,381 dated Jan. 20, 2011.

Official Communication for U.S. Appl. No. 11/925,381 dated Jun. 17, 2011.

Official Communication for U.S. Appl. No. 11/925,381 dated Jan. 25, 2012.

Official Communication for U.S. Appl. No. 13/457,322 dated Mar. 22, 2013.

Official Communication for U.S. Appl. No. 13/457,322 dated Dec. 11, 2013.

* cited by examiner

DYNAMIC TRUNK DISTRIBUTION ON EGRESS

CROSS-REFERENCE TO RELATED APPLICATIONS

The present application is a Continuation of U.S. application Ser. No. 13/457,322 entitled "Dynamic Trunk Distribution On Egress", filed Apr. 26, 2012, which is a Continuation of U.S. application Ser. No. 11/925,381 entitled "Dynamic Trunk Distribution On Egress", filed Oct. 26, 2007, the benefit of which is claimed under 35 U.S.C. § 120, which in turn claims priority from provisional application Ser. No. 60/965,620 filed on Aug. 20, 2007, the benefit of the earlier filing date of which is hereby claimed under 35 U.S.C. § 119 (e) and 37 C.F.R. § 1.78, and each of which is further incorporated herein by reference.

TECHNICAL FIELD

The present invention relates generally to network communications, and more particularly, but not exclusively, to managing traffic over Open Systems Interconnection (OSI) Level 2 switch ports.

BACKGROUND

Link aggregation, also known as trunking, is a mechanism for using multiple switch ports in parallel to increase link speed beyond the speed provided by a single port or link. Link aggregation is also described in more detail in IEEE 802.3, which is incorporated herein by reference.

Link aggregation may increase the availability of the link-aggregated connection and may also increase throughput. A common implementation involves a switch tying two or more ports on the switch together such that they operate together as a single port or link. In practice, if one port fails, then another is available for use. In theory, the throughput may be increased by a factor equal to the number of links that are aggregated. However, in practice, this amount of throughput increase is rarely the case.

One challenge in using link aggregation is that the sequence of frames may be reordered if the frames for a flow are divided between several links. Such reordering may cause diminished performance, loss of information, corruption of data, or the like. Reordering of frames between different communications or flows may not cause such problems. Generally, it is preferable to maintain the same order for frames within the same communication or flow. This ordering requirement is sometimes referred to as the "Link Invariant."

One mechanism for ensuring the Link Invariant is to map the communication or flow to a particular link/switch port based on a stateless hash. Common hash functions include a hash on an OSI Level two (2) MAC address, an OSI Level three (3) address, an OSI Level four port, or some combination thereof. The result of the hash is then associated with one of the links within the link aggregation. Consequently frames for the flow are sent over the associated link. However, even using a stateless hash mapping function, optimal distribution of communication over the links in an aggregation/trunk is rarely achieved. Therefore, it is with respect to this consideration and others that the current invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
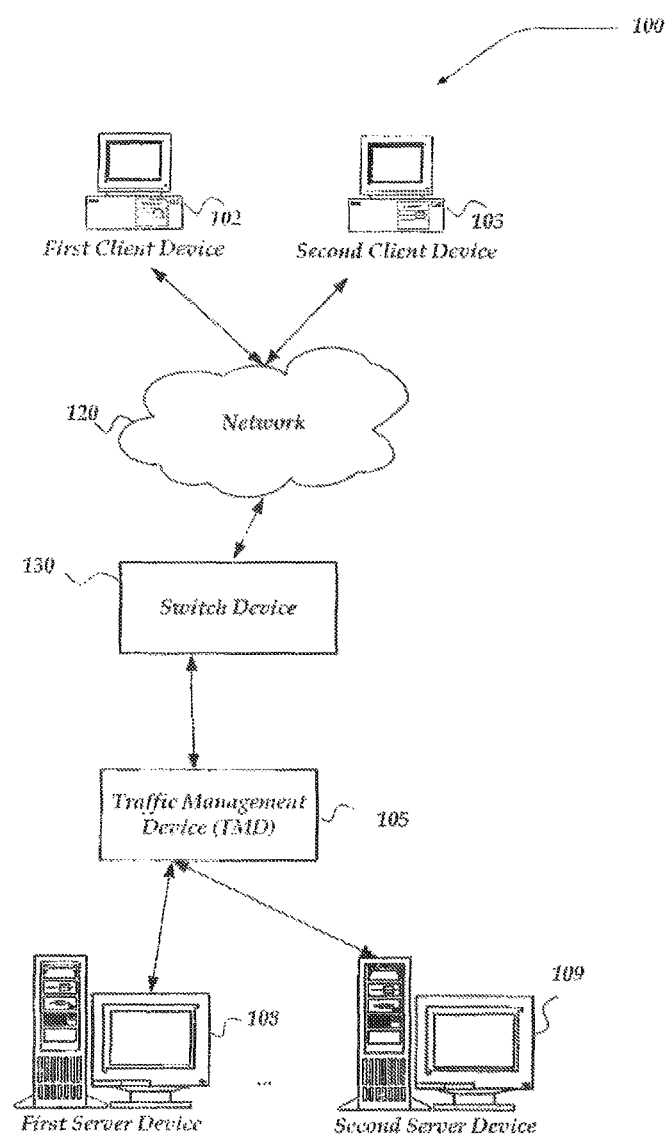
FIG. 1 shows a block diagram illustrating an environment for practicing the invention.

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "network connection" refers to a collection of links and/or software elements that enable a computing device to communicate with another computing device over a network. One such network connection may be a TCP connection. TCP connections are virtual connections between two network nodes, and are typically established through a TCP handshake protocol. The TCP protocol is described in more detail in Request for Comments (RFC) 793, which is available through the Internet Engineering Task Force (IETF), and which is incorporated herein by reference. A network connection "over" a particular path or link refers to a network connection that employs the specified path or link to establish and/or maintain a communication. The term "node" refers to a network element that typically interconnects one or more devices, or even networks.

As used herein, the term "flow" refers to an identification of network information having at least one network characteristic. A common network characteristic may be determined based on a transport mechanism of the network information, a source, or destination of the network information, or any other characteristics associated with the network information.

As used herein, the term "OSI Level 2 switch port" or simply "switch port" refers to an address for transceiving data at the Data Link Layer of the OSI model. The term "frame" refers to a unit of data configured to be sent at the Data Link Layer of the OSI model.

Briefly, the embodiments of the invention are directed towards systems, computer readable media, and methods for managing network traffic over a plurality of Open Systems Interconnection (OSI) Level 2 switch ports. Network traffic is received over the plurality of OSI Level 2 switch ports. At least a part of the network traffic is categorized into a flow. The categorization may be based on an IP address, an OSI Level 4 port, a protocol type, a Virtual Local Area Network (VLAN) number, or the like. One of the plurality of OSI Level 2 switch ports is selected based on a load-balancing metric. The load-balancing metric may be a priority of the flow, a congestion characteristic, a prediction of a load usage for the flow, a combination thereof, or the like. A frame associated with the flow is sent over the selected switch port.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes first and second client devices 102-103, network 120, switch device 130, traffic management device (TMD) 105, and first and second server devices 108-109.

Generally, first and second client devices 102-103 may include virtually any computing device capable of connecting to another computing device to send and receive information, including web requests for information from a server device, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, first and second client devices 102-103 may be any device that is capable of connecting using a wired or wireless communication medium such as a PDA, POCKET PC, wearable computer, and any other device that is equipped to communicate over a wired and/or wireless communication medium.

First and second client devices 102-103 may further include a client application that is configured to manage various actions. Moreover, first and second client devices 102-103 may also include a web browser application that is configured to enable an end-user to interact with other devices and applications over network 120.

First and second client devices 102-103 may communicate with network 120 employing a variety of network interfaces and associated communication protocols. First and second client devices 102-103 may, for example, use various dial-up mechanisms with a Serial Line IP (SLIP) protocol, Point-to-Point Protocol (PPP), and the like. As such, first and second client devices 102-103 may transfer data at a low transfer rate, with potentially high latencies. For example, first and second client devices 102-103 may transfer data at about 14.4 to about 46 kbps, or potentially more. In another embodiment, first and second client devices 102-103 may employ a higher-speed cable, Digital Subscriber Line (DSL) modem, Integrated Services Digital Network (ISDN) interface, ISDN terminal adapter, or the like. As such, first and second client devices 102-103 may be considered to transfer data using a high bandwidth interface varying from about 32 kbps to over about 622 Mbps, although such rates are highly variable, and may change with technology. Further, first client device 102 may transfer data at a different rate then second client device 103.

Network 120 is configured to couple first and second client devices 102-103, with other network devices, such as switch 130, TMD 105, or the like. Network 120 is enabled to employ any form of computer readable media for communicating information from one electronic device to another. In one embodiment, network 120 may include the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 120 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as first and second client devices 102-103, or the like, with various degrees of mobility. For example, network 120 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 120 includes any communication method by which information may travel between one network device and another network device.

Additionally, network 120 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Switch device 130 includes any device for forwarding data between network devices. Switch device 130 may perform transparent bridging, at up to the speed provided by the hardware and/or software of switch device 130. Switch device 130 forwards frames over any of the OSI Level 1 or above ports on switch device 130. Switch device 130 may connect Ethernet, Fiber Channel, ATM, 802.11, token ring, or other types of packet switched network segments together to form a network, such as network 105. Switch device 130 may forward, store, perform error checking (e.g., checksum), or perform adaptive switching on the network traffic. In one embodiment, switch device 130 may perform dynamic trunking or link aggregation. In one embodiment, switch device 130 may map a network traffic flow on a link (e.g., OSI Level 2 switch port) in a link aggregation, using for example, a stateless hash. Network traffic may be sent out (e.g., egress traffic) to another device over the selected link/OSI Level 2 switch port. In one embodiment, switch device 130 may send data within the network traffic to TMD 105 over at least one link in a link aggregation. In another embodiment, switch device 130 may be integrated within or as a component of TMD 105.

One embodiment of a network device that could be used as TMD 105 is described in more detail below in conjunction with FIG. 3. Briefly, however, TMD 105 includes virtually any network device that manages network traffic. Such devices include, for example, routers, proxies, firewalls, load balancers, cache devices, application accelerators, devices that perform network address translation, any combination of the preceding devices, or the like. TMD 105 may control, for example, the flow of data packets delivered to or forwarded from an array of server device devices, such as first and second server devices 108-109. In one embodiment, messages sent between the TMD 105 and the first and second server devices 108-109 may be over a secure channel, such as an SSL connection. Similarly, messages sent between TMD 105 and first and second client devices 102-103 may also be over a secure channel.

TMD 105 may direct a request for a resource to a particular one of first and second server devices 108-019 based on network traffic, network topology, capacity of a server device, content requested, and a host of other traffic distribution mechanisms. TMD 105 may receive data packets from and transmit data packets to the Internet, an intranet, or a local area network accessible through another network. TMD 105 may recognize packets that are part of the same communication, flow, and/or stream and may perform special processing on such packets, such as directing them to the same server device so that state information is maintained. TMD 105 also may support a wide variety of network applications such as Web browsing, email, telephony, streaming multimedia and other traffic that is sent in packets. The BIG-IP® family of traffic managers, by F5 Networks Inc. of Seattle, Wash., are examples of TMDs. TMDs are described in more detail in U.S. Pat. No. 7,102, 996 to Amdahl, et al. entitled "Method and System for Scaling Network Traffic Managers," which is incorporated herein by reference. In one embodiment, TMDs 105 may be integrated with one or more of first and second server devices 108-109, and provide content or services in addition to the TMD functions described herein.

Further, TMD 105 may be implemented using one or more personal computers, server devices, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets.

TMD 105 may receive requests from first and second client devices 102-103. TMD 105 may select one or more of the first and second server devices 108-109 to forward the request. TMD 105 may employ any of a variety of criteria and mechanisms to select first and second server devices 108-109, including those mentioned above, load balancing mechanisms, and the like. TMD 105 may receive a response to the request and forward the response to first and second client devices 102-103.

In one embodiment, TMD 105 may receive data from one of first and/or second client devices 102-103, over network 120, and through switch 130. In one embodiment, the data may be received over a plurality of OSI Level 2 switch ports (e.g., in parallel). TMD 105 may also categorize the data into a flow. In one embodiment, TMD 105 may forward the data to one of first and second server devices 108-109. Reply data received from first and second server devices 108-109 may be also categorized into a flow. TMD 105 may select a switch port within the plurality of OSI Level 2 switch ports based on a load-balancing metric to forward the reply data. The reply data may be sent over the selected switch port, through switch 130 (e.g., over a link aggregation), and through network 120. The reply data may then be received by one of first and/or second client devices 102-103.

First and second server devices 108-109 may include any computing device capable of communicating packets to another network device. Each packet may convey a piece of information. A packet may be sent for handshaking, i.e., to establish a connection or to acknowledge receipt of data. The packet may include information such as a request, a response, or the like. Generally, packets received by first and second server devices 108-109 may be formatted according to TCP/IP, but they could also be formatted using another transport protocol, such as SCTP, UDP, NetBEUI, IPX/SPX, token ring, similar IPv4/6 protocols, and the like. Moreover, the packets may be communicated between first and second server devices 108-109, TMD 105, and first and second client devices 102-103 employing HTTP, HTTPS, Real-Time Streaming Protocol (RTSP), or any of a variety of current or later developed protocols.

In one embodiment, first and second server devices 108-109 may be configured to operate as a website server. However, first and second server devices 108-109 are not limited to web server devices, and may also operate a messaging server, a File Transfer Protocol (FTP) server, a database server, content server, and the like. Additionally, each of first and second server devices 108-109 may be configured to perform a different operation. Thus, for example, first server device 108 may be configured as a messaging server, while second server device 109 may be configured as a database server. Moreover, while first and second server devices 108-109 may operate as other than a website, they may still be enabled to receive an HTTP communication, an RTSP communication, as well as a variety of other communication protocols.

Devices that may operate as first and second server devices 108-109 include personal computers, desktop computers, multiprocessor systems, microprocessor-based or programmable consumer electronics, network PCs, server devices, and the like.

It is further noted that terms such as client and server device may refer to functions within a device. As such, virtually any device may be configured to operate as a client device, a server device, or even include both a client and a server device function. As described above, the client device may request the network resource, and TMD 105 may reply with the appropriate version of the content for the requestor client device.

Figure 2:
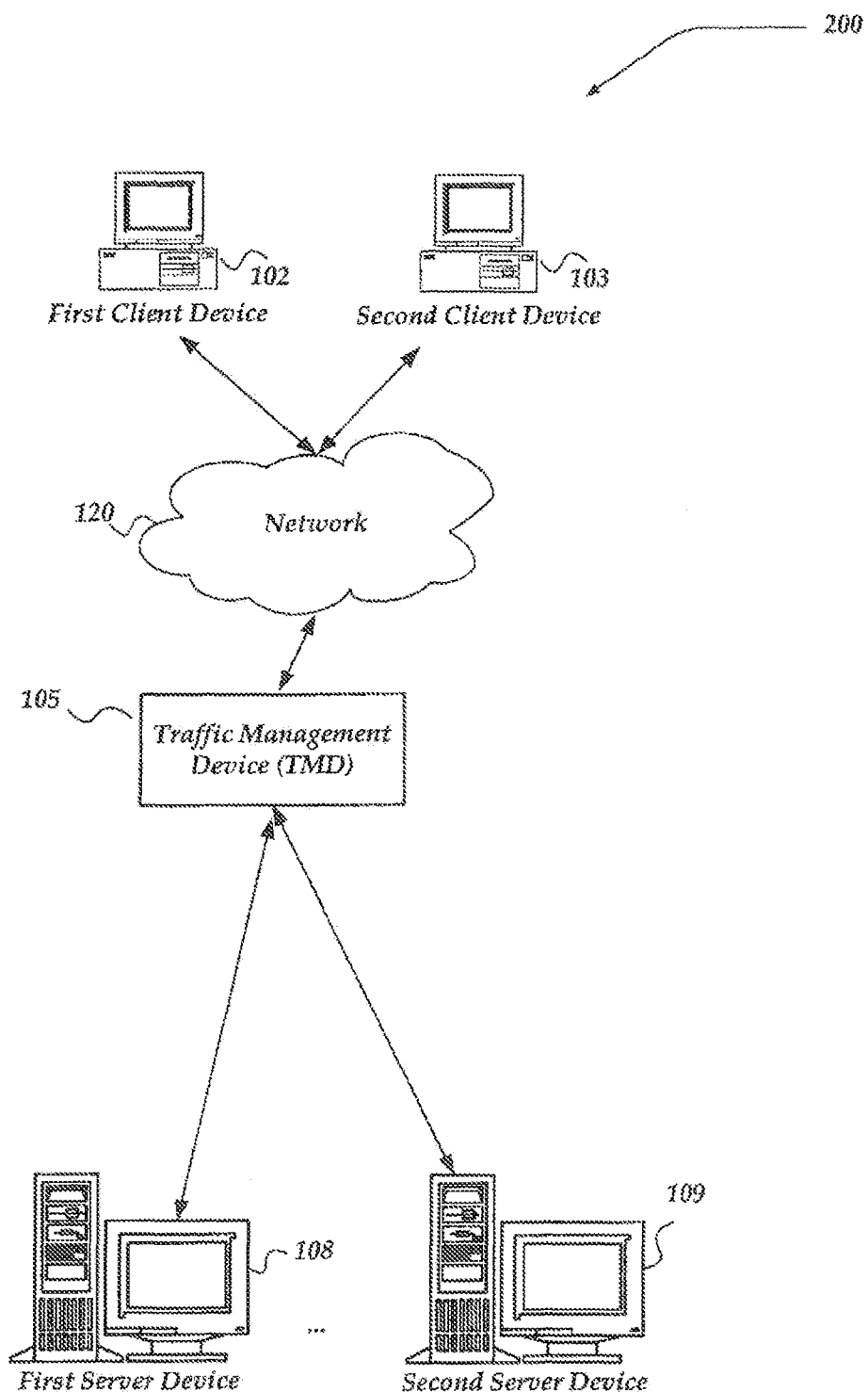
FIG. 2 shows a block diagram illustrating another environment for practicing the invention.

FIG. 2 illustrates another embodiment of an environment in which the invention may operate. As shown, system 200 of FIG. 2 includes the components of FIG. 1. Additionally, system 200 does not include switch 130. In this embodiment, TMD 105 may be in communication with network 120, and/or at least one of first and second servers 108-109 over a link aggregation. In one embodiment, ingress traffic from network 120, and/or at least one of first and second servers 108-109, first and second client 102-103 may be received, categorized into a flow, and sent over a selected switch port based on a load-balancing metric, as described above. In one embodiment, TMD 105 may simply forward the egress data, over the selected switch port, to a recipient of the data. In another embodiment, TMD 105 may parse, compress, and/or otherwise modify the egress data before sending the data over the selected switch port.

Illustrative Network Device

Figure 3:
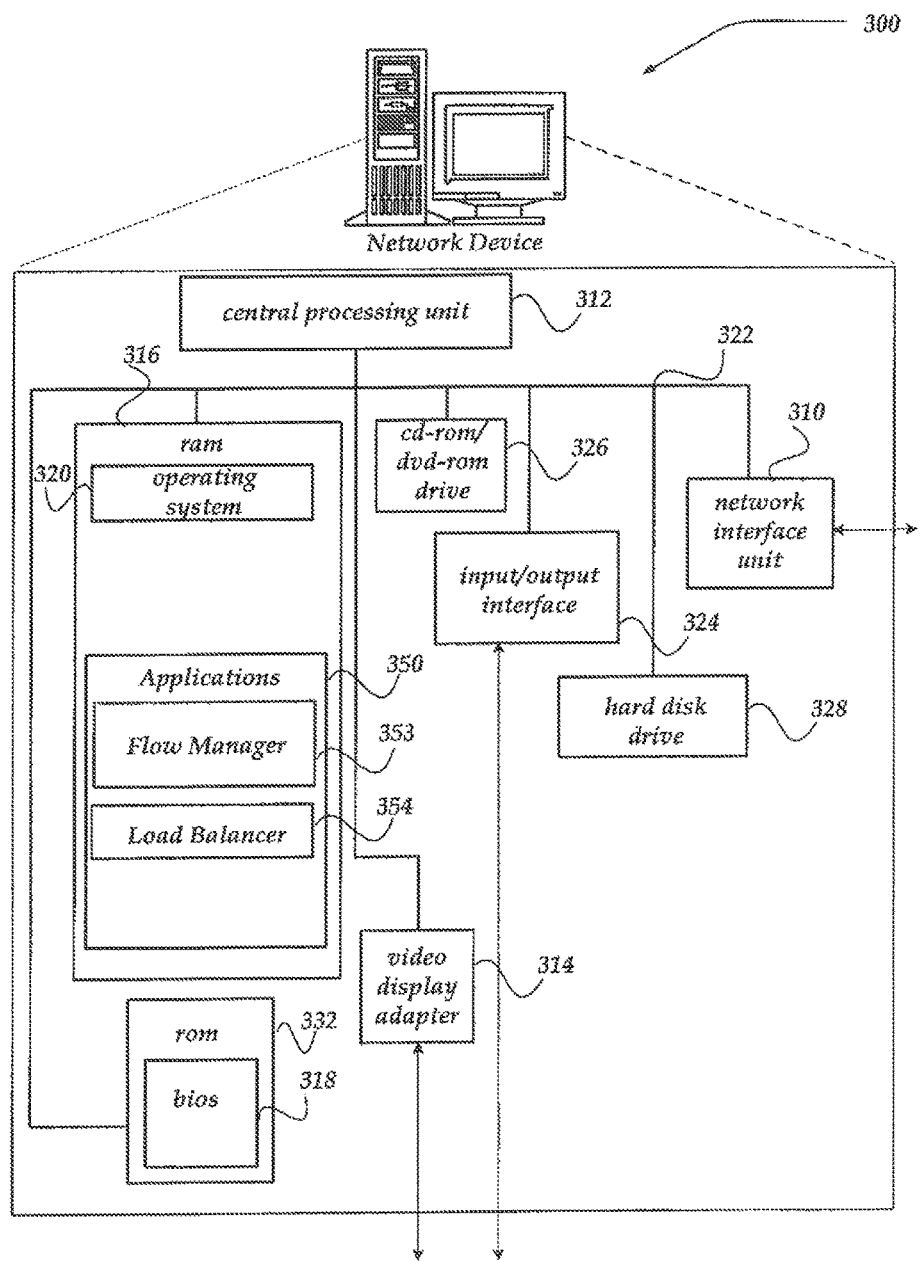
FIG. 3 illustrates one embodiment of a network device for managing traffic over an OSI Level 2 switch port.

FIG. 3 shows one embodiment of a network device, according to one embodiment of the invention. Network device 300 may include many more or less components than those shown. The components shown, however, are sufficient to disclose an illustrative embodiment for practicing one or more embodiments of the invention. Network device 300 may represent, for example, TMD 105 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Network device 300 also includes applications 350, which may be expressed as one or more executable instructions stored at one or more locations within RAM 316, although the instructions could be stored elsewhere.

As illustrated in FIG. 3, network device 300 also can communicate with the Internet, or some other communications network via network interface unit 310, which is constructed for use with various communication protocols including the TCP/IP protocol. Network interface unit 310 is sometimes known as a transceiver, transceiving device, or network interface card (NIC).

The mass memory 316, 326, 328, and 332 described herein and shown in FIG. 3 illustrates another type of computer-readable media, namely computer storage media. Computer storage media may include volatile, nonvolatile, removable, and non-removable media implemented in any method or technology for storage of information, such as computer readable instructions, data structures, program modules, or other data, which may be obtained and/or executed by CPU 312 to perform one or more portions of process 400 shown in FIG. 4, for example. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store other types of program code and data as applications 350, which may be are loaded into mass memory and run on operating system 320. Examples of application 350 may include email client/server programs, routing programs, schedulers, calendars, database programs, word processing programs, HTTP programs, RTSP programs, traffic management programs, security programs, and any other type of application program.

Network device 300 may also include an SMTP handler application for transmitting and receiving e-mail, an HTTP handler application for receiving and handing HTTP requests, a RTSP handler application for receiving and handing RTSP requests, and an HTTPS handler application for handling secure connections. The HTTPS handler application may initiate communication with an external application in a secure fashion. Moreover, network device 300 may further include applications that support virtually any secure connection, including TLS, TLS, EAP, SSL, IPSec, and the like.

Network device 300 may also include input/output interface 324 for communicating with external devices, such as a mouse, keyboard, scanner, or other input/output devices not shown in FIG. 3. Likewise, network device 300 may further include additional mass storage facilities such as CD-ROM/DVD-ROM drive 326 and hard disk drive 328. Hard disk drive 328 may be utilized to store, among other things, application programs, databases, and the like in the same manner as the other mass memory components described above.

In one embodiment, the network device 300 may include at least one Application Specific Integrated Circuit (ASIC) chip (not shown) coupled to bus 322. The ASIC chip can include logic that performs some or all of the actions of network device 300. For example, in one embodiment, the ASIC chip can perform a number of packet processing functions for incoming and/or outgoing packets. In one embodiment, the ASIC chip can perform at least a portion of the logic to enable the operation of flow manager 353, load balancer 354, or any other components.

In one embodiment, network device 300 can further include one or more field-programmable gate arrays (FPGA) (not shown), instead of, or in addition to, the ASIC chip. A number of functions of network device 300 can be performed by the ASIC chip, the FPGA, by CPU 312 with instructions stored in memory, or by any combination of the ASIC chip, FPGA, and CPU.

Flow manager 353 may include any component configured to manage a network traffic (e.g., a plurality of network frames/packets) configured to be transceived over network interface 310. In one embodiment, flow manager 353 may receive the network traffic, over network interface 310. In one embodiment, operating system 320 may associate the received network traffic with an OSI Level 2 switch port. Operating system 320 may manage a plurality of switch ports. In one embodiment, flow manager 353 may categorize at least a part of the network traffic into a flow, based on a hash function, or the like. Flow manager 353 may also associate the flow with at least one of the OSI Level 2 switch ports provided by operating system 320. In one embodiment, an association between a flow and a port may be stored in a record, file, database, or the like, in mass memory, for example. In one embodiment, flow manager 353 may request an identity (e.g., a port number) for a switch port from load balancer 354. In one embodiment, flow manager 353 may send and/or forward data over network interface 310 and/or over the selected switch port.

Load balancer 354 may include any component configured to select a switch port from the plurality of OSI Level 2 switch ports based on a load-balancing metric. Load balancer 354 may maintain statistics, such as bandwidth usage, congestion characteristics of data over network interface 310 and/or the switch ports, or the like. The maintained statistics may be stored in mass memory, updated, and/or retrieved on a schedule (periodically), or the like. In one embodiment, load balancer 354 may select a switch port which minimizes a load-balancing metric. Such metrics may include, but are not limited to bandwidth metrics, congestion metrics, network characteristics, quality of service metrics, any combination of these metrics and/or other metrics, or the like. In another embodiment, load balancer 354 may select the switch port based on a round-robin algorithm. In any case, the selected switch port is provided to flow manager 353 for further processing.

Generalized Operation

Figure 4:
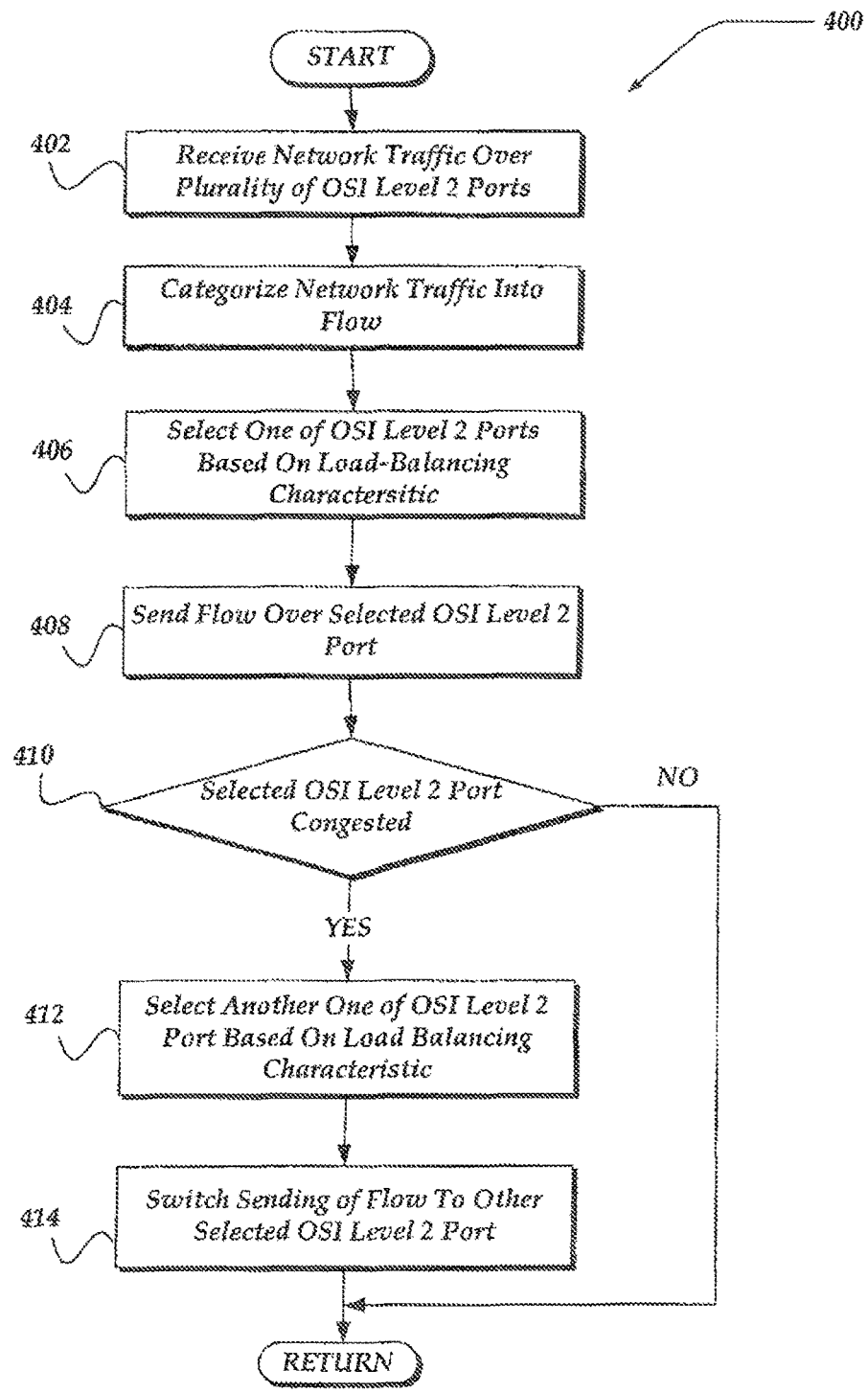
FIG. 4 illustrates a logical flow diagram generally showing one embodiment for managing traffic over an OSI Level 2 switch port.

The operation of certain aspects of the invention will now be described with respect to FIG. 4. FIG. 4 illustrates a logical flow diagram generally showing one embodiment for managing traffic over an OSI Level 2 switch port. Process 400 of FIG. 4 may be implemented, for example, within TMD 105 FIG. 1.

Process 400 begins, after a start block, at block 402, where network traffic is received over a plurality of OSI Level 2 switch ports (e.g., in parallel). In one embodiment, the plurality of OSI Level 2 switch ports may be a link aggregation. In one embodiment, the network traffic may be received at a particular MAC address, at, for example, a network switch device, a traffic management device, or the like. Processing then continues to block 404.

At block 404, network traffic is categorized into a flow. In one embodiment, the categorization may include determining a flow characteristic for at least a portion of the network traffic, wherein the flow characteristic includes an Internet Protocol (IP) address, a port number for an OSI Level 3, OSI Level 4, or above protocol associated with the network traffic, or the like. In one embodiment, the flow characteristic may include a source IP address of the device sending data, a destination IP address for the device receiving the data, a source OSI Level 4 port of the sending device, a destination OSI Level 4 port of the receiving device, a protocol type, and/or a Virtual Local Area Network (VLAN) number. In another embodiment, the flow characteristic may also include an Internet Control Message Protocol (ICMP) type. ICMP types are described in more detail in RFC 792, which is incorporated herein by reference.

In one embodiment, network traffic associated with the same flow characteristic(s) may be categorized or otherwise categorized into the same flow. For example, network traffic data associated with a source IP address, destination IP address, source port number, destination port number, protocol type, and VLAN number (e.g., 66.235.4.234, 66.235.4.235, 80, 80, HTTP, 2) may be categorized into flow 1, while network traffic data (e.g., 66.235.4.234, 66.235.4.235, 8080, 8080, HTTPS, 3) may be categorized into flow 2. In one embodiment, the mapping from the flow characteristic(s) into a particular flow may be based on a stateless fast hash, a look up table, content-addressable memory (CAM), or the like. Accordingly, the network traffic is categorized into the flow associated with the determined flow characteristic. Processing then continues to block 406.

At block 406, one of the plurality of OSI Level 2 switch ports is selected based on load-balancing metric. In one embodiment, the selected port may be one link of a link aggregation. In one embodiment, the load-balancing metrics include a priority of the flow, a congestion characteristic associated for each of the plurality of OSI Level 2 switch ports, a prediction of a load usage for the flow, a combination of at least two of the load-balancing metrics, a round-robin algorithm, or the like. In one embodiment, the load-balancing metric may be a number. In one embodiment, the combination of the at least two of the load-balancing metrics may be a weighted sum. For example, a congestion measure may be weighted higher (e.g., 80%), while a prediction of load usage may be weighted lower (20%) to provide a final load-balancing metric. Processing then continues to block 408.

At block 408, the flow is sent over the selected OSI Level 2 switch port. In one embodiment, each frame in the network traffic categorized into the flow (e.g., frame associated with the flow) is sent over the selected OSI Level 2 switch port (e.g., in a series). Each frame may be sent in First In First Out (FIFO) order. In one embodiment, other network operations may also be performed on the flow (e.g., data within the flow). For example, each frame may be stored before sending. In one embodiment, at least one frame may be checked for errors before sending. For example, the at least one frame may be checked with a checksum algorithm, or the like. Processing then continues to block 410.

At decision block 410, it is determined whether the selected OSI Level 2 switch port is congested. In one embodiment, the selected OSI Level 2 switch port may be determined to be congested if an amount of network traffic within a flow categorized onto the selected OSI Level 2 switch port is above a threshold. The threshold may predetermined (e.g., 1000 megabits per second (Mbits/s)), a percentage of the total capacity capable of being sent over the selected port (e.g., 80%), or may be adaptive and/or related to the amount of network traffic communicated (or expected to be communicated) over a non-selected OSI Level 2 switch port in the plurality of OSI Level 2 switch ports. In one embodiment, the adaptive threshold may be a percentage of or greater than the next highest network flow associated with the non-selected OSI Level 2 switch port. In one embodiment, the determination whether the selected OSI Level 2 switch port is congested may be performed while the flow is sent over the selected OSI Level 2 switch port (e.g., at block 408). In another embodiment, the determination may be performed before block 408. In any case, if it is determined that the selected OSI Level 2 switch port is congested, processing continues to block 412. Otherwise, processing returns to a calling process for further processing.

At block 412, another one of OSI Level 2 switch port is selected based on load balancing characteristic. The other selected OSI Level 2 switch port may be selected from the available plurality of OSI Level 2 switch ports less the prior selected OSI Level 2 switch port. For example, port 1 may be selected from the plurality (1, 2, 3). Port 1 may be determined to be congested. Port 2 may be selected from the available plurality of (2, 3). Processing then continues to block 414.

At block 414, the sending of the flow is switched to the other selected OSI Level 2 switch port. In one embodiment, the categorization of the flow from the selected OSI Level 2 switch port may be switched to the other selected OSI Level 2 switch port. For example, the mapping to the appropriate port may be changed in a lookup table. Network traffic associated with the flow may then be sent over the other selected OSI Level 2 switch port. Processing then returns to a calling process for further processing.

It will be understood that each block of a flowchart illustration need not be limited in the ordering shown in the illustration, and may be performed in any ordering, or even performed concurrently, without departing from the spirit of the invention. It will also be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter.

What is claimed as new and desired to be protected by Letters Patent of the United States is:

1. A method, comprising:
receiving network traffic over at least one Open Systems Interconnection (OSI) Level 2 switch ports in a plurality of OSI Level 2 switch ports, wherein each frame of network packets is associated with a categorized flow of the network traffic and is stored and checked for one or more errors, and wherein the categorization of the flow is based on a mapping of a determined characteristic of the network packets;
employing a first load balancing determination to select a first OSI Level 2 switch port from the plurality of OSI Level 2 switch ports based in part on a weighted sum of two or more load-balancing metrics;
monitoring the selected first switch port to determine whether the first switch port is congested based in part on evaluating a percentage of a next highest network traffic through a non-selected switch port, wherein the congestion determination is performed before the network traffic flow is provided over the selected first switch port and when the network traffic flow is provided over the selected first switch port;
employing a second load balancing determination to use the first switch port that is determined to be congested to select and switch the flow to a second switch port in the plurality of switch ports based on one or more other load balancing characteristics from that portion of the switch ports that does not include the congested first switch port;
and otherwise, sending at least a portion of the network packets associated with the flow over the selected first switch port.

2. The method of claim 1, wherein at one of the load-balancing metrics includes a priority of the flow, a congestion characteristic associated with each of the plurality of switch ports, or a prediction of a load usage for the flow.

3. The method of claim 1, further comprising:
employing a data structure to store a mapping between the flow and the first or second OSI Level 2 switch port selected for sending the flow.

4. The method of claim 1, wherein determining whether the first switch port is congested is further based on an amount of traffic within the flow that is above a predictive adaptive threshold.

5. The method of claim 1, wherein the categorized flow is determined based on categorizing the network traffic according to at least one of a network address or a port number.

6. The method of claim 1, wherein the plurality of switch ports are provided for a link aggregation.

7. The method of claim 1, wherein determining whether the first switch port is congested is further based on determining that an amount of network traffic with the flow is above a threshold that is further determined based on a percentage of a total capacity capable of being sent over the first switch port.

8. A non-transitory machine-readable storage device having stored thereon a plurality of machine-executable instructions, the instructions configured to perform actions, including:
receiving network traffic over at least one Open Systems Interconnection (OSI) Level 2 switch ports in a plurality of OSI Level 2 switch ports, wherein each frame of network packets is associated with a categorized flow of the network traffic and is stored and checked for one or more errors, and wherein the categorization of the flow is based on a mapping of a determined characteristic of the network packets;
employing a first load balancing determination to select a first OSI Level 2 switch port from the plurality of OSI Level 2 switch ports based in part on a weighted sum of two or more load-balancing metrics;
monitoring the selected first switch port to determine whether the first switch port is congested based in part on evaluating a percentage of a next highest network traffic through a non-selected switch port, wherein the congestion determination is performed before the network traffic flow is provided over the selected first switch port and when the network traffic flow is provided over the selected first switch port;
employing a second load balancing determination to use the first switch port that is determined to be congested to select and switch the flow to a second switch port in the plurality of switch ports based on one or more other load balancing characteristics from that portion of the switch ports that does not include the congested first switch port;
and otherwise, sending at least a portion of the network packets associated with the flow over the selected first switch port.

9. The storage device of claim 8, wherein the mapping may be stored in at least one of a recode, file, or database.

10. The storage device of claim 8, wherein selecting the first switch port from the plurality of switch ports based on a load-balancing metric that further includes a congestion metric, a network characteristic, or a combination of two or more of said metrics.

11. The storage device of claim 8, wherein the instructions perform actions, further including:
   determining whether a packet is related to the flow based in part on a stateless hash, an Internet Protocol (IP) address, or a port number.

12. The storage device of claim 8, wherein determining whether the first switch port is congested is further based on determining that an amount of network traffic with the flow is above a threshold that is further determined based on a percentage of a total capacity capable of being sent over the first switch port.

13. The storage device of claim 8, wherein determining whether the first switch port is congested is further based on an amount of traffic within the flow that is above a predictive adaptive threshold.

14. The storage device of claim 8, wherein selecting the first switch port further includes employing a weighted combination of at least a prediction of a load usage bandwidth flow and a congestion flow.

15. A method, comprising:
   identifying a plurality of switch ports within a link aggregation; and
   executing instructions on one or more processors that perform actions, including:
      receiving network traffic over at least one Open Systems Interconnection (OSI) Level 2 switch ports in a plurality of OSI Level 2 switch ports, wherein each frame of network packets is associated with a categorized flow of the network traffic and is stored and checked for one or more errors, and wherein the categorization of the flow is based on a mapping of a determined characteristic of the network packets;
      employing a first load balancing determination to select a first OSI Level 2 switch port from the plurality of OSI Level 2 switch ports based in part on a weighted sum of two or more load-balancing metrics;
      monitoring the selected first switch port to determine whether the first switch port is congested based in part on evaluating a percentage of a next highest network traffic through a non-selected switch port, wherein the congestion determination is performed before the network traffic flow is provided over the selected first switch port and when the network traffic flow is provided over the selected first switch port;
      employing a second load balancing determination to use the first switch port that is determined to be congested to select and switch the flow to a second switch port in the plurality of switch ports based on one or more other load balancing characteristics from that portion of the switch ports that does not include the congested first switch port;
      and otherwise, sending at least a portion of the network packets associated with the flow over the selected first switch port.

16. The method of claim 15, wherein determining whether the first switch port is congested is further based on an amount of traffic within the flow that is above a predictive adaptive threshold.

17. The method of claim 15, wherein selecting the first switch port further includes employing a weighted combination of at least a prediction of a load usage bandwidth flow and a congestion flow.

18. The method of claim 15, wherein selecting the first switch port from the plurality of switch ports is further based on a congestion metric, a network characteristic, or a combination of two or more of said metrics.

19. The method of claim 15, wherein determining whether the first switch port is congested is further based on determining that an amount of network traffic with the flow is above a threshold that is further determined based on a percentage of a total capacity capable of being sent over the first switch port.

20. The method of claim 15, wherein storing the mapping further includes storing at least one of a network address or a port number.

* * * * *